United States Patent
Ataman et al.

(10) Patent No.: US 8,555,917 B2
(45) Date of Patent: Oct. 15, 2013

(54) POWER LINE DATA ACQUISITION

(75) Inventors: Vedat T. Ataman, Lynchburg, VA (US); Lew McKeague, Forest, VA (US)

(73) Assignee: Areva NP Inc, Lynchburg, VA (US)

(*) Notice: Subject to any disclaimer, the term of this patent is extended or adjusted under 35 U.S.C. 154(b) by 718 days.

(21) Appl. No.: 12/725,143

(22) Filed: Mar. 16, 2010

(65) Prior Publication Data

US 2010/0243062 A1    Sep. 30, 2010

Related U.S. Application Data

(60) Provisional application No. 61/211,165, filed on Mar. 26, 2009.

(51) Int. Cl.
*F16K 37/00* (2006.01)
*G01L 5/00* (2006.01)
*G01L 5/12* (2006.01)

(52) U.S. Cl.
CPC .............. *F16K 37/0041* (2013.01); *G01L 5/00* (2013.01); *G01L 5/12* (2013.01); *G01L 5/0042* (2013.01)
USPC ................. 137/551; 73/862.49; 73/862.541; 73/865.9; 137/552; 376/245; 376/259

(58) Field of Classification Search
CPC ... F16K 37/00; F16K 37/025; F16K 37/0041; F16K 37/0075; F16K 37/0083; G01L 5/00; G01L 5/0028; G01L 5/0042; G01L 5/0061; G01L 5/12; G01L 5/22; G01R 31/00
USPC ................. 73/168, 862.49, 862.541, 865.9; 137/551–552; 376/245, 259
See application file for complete search history.

(56) References Cited

U.S. PATENT DOCUMENTS

| | | | | |
|---|---|---|---|---|
| 4,694,390 A | * | 9/1987 | Lee | 700/45 |
| 4,816,987 A | * | 3/1989 | Brooks et al. | F16K 37/0075 |
| 4,860,596 A | * | 8/1989 | Charbonneau et al. | 73/168 X |
| 4,987,358 A | * | 1/1991 | Branam | 318/603 |
| 5,008,655 A | * | 4/1991 | Schlesinger et al. | 340/691.4 |
| 5,033,012 A | * | 7/1991 | Wohld | 73/865.9 X |

(Continued)

FOREIGN PATENT DOCUMENTS

| | | | | |
|---|---|---|---|---|
| CA | 2129470 A | * | 2/1995 | F16K 37/00 |
| EP | 207722 A2 | * | 1/1987 | G05B 19/19 |

(Continued)

OTHER PUBLICATIONS

4A23 (I/O: Analog) from Mesa Electronics—Military Embedded Systems, High-resolution, 20-bit, low-power, delta-sigma, A/D card for the PC/104 bus, Mesa Electronics, Apr. 1999, 2 pages, downloaded from http://mil-embedded.com/products/id/1394 on Jan. 11, 2013.*

*Primary Examiner* — Thomas P Noland
(74) *Attorney, Agent, or Firm* — Davidson, Davidson & Kappel, LLC

(57) ABSTRACT

A motor operated valve diagnostic data acquisition system including: a motor operated valve assembly; a transmitter, the transmitter being permanently connected in a housing of a motor operated valve assembly; a receiver, the transmitter transmitting signals to the receiver via motor operated valve cables, the cables being existing motor operated valve cables; and electronic circuitry connected to the receiver, the electronic circuitry processing the signals received by the receiver.

21 Claims, 6 Drawing Sheets

(56) References Cited

U.S. PATENT DOCUMENTS

| | | | | |
|---|---|---|---|---|
| 5,174,152 A | * | 12/1992 | Wohld | 73/168 |
| 5,239,874 A | * | 8/1993 | Hale | 73/168 X |
| 5,483,841 A | * | 1/1996 | Casada | 73/865.9 X |
| 5,594,175 A | * | 1/1997 | Lyon et al. | 73/168 X |
| 6,637,267 B2 | * | 10/2003 | Fiebelkorn et al. | F16K 37/0075 |
| 7,284,570 B1 | * | 10/2007 | Gracik et al. | F16K 37/0025 |
| 8,342,478 B1 | * | 1/2013 | Cordray et al. | 73/168 X |

FOREIGN PATENT DOCUMENTS

| | | | | |
|---|---|---|---|---|
| EP | 287299 A2 | * | 10/1988 | 137/551 |
| JP | 01003383 A | * | 1/1989 | F16K 31/04 |
| WO | WO 8704244 A1 | * | 7/1987 | 73/168 |
| WO | WO 9615401 A2 | * | 5/1996 | F16K 37/00 |
| WO | WO 2006131991 A1 | * | 12/2006 | F16K 37/00 |

\* cited by examiner

Torque/Thrust

Torque/Thrust (FM Signal)

Current

Current (FM Signal)

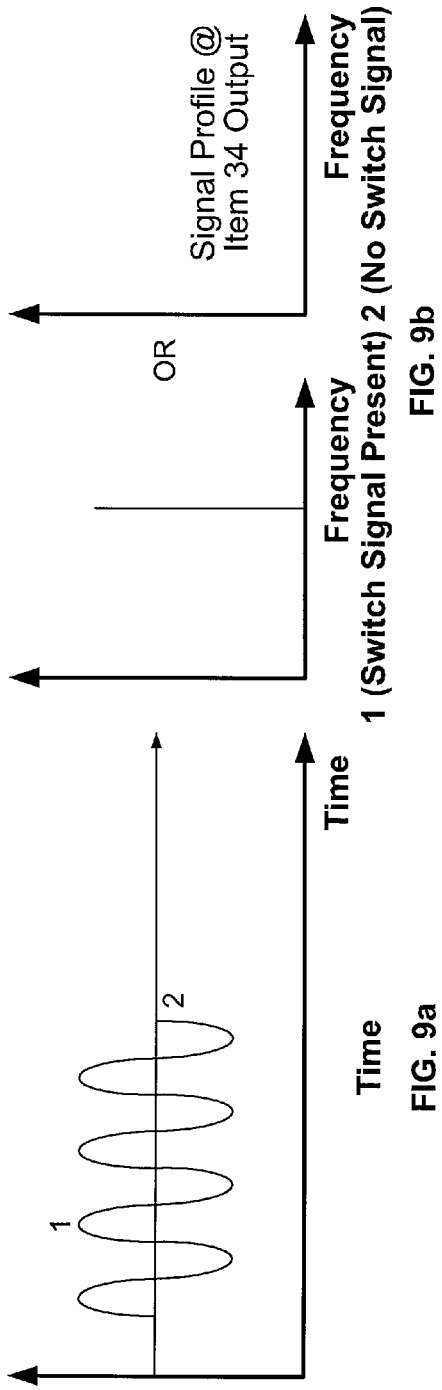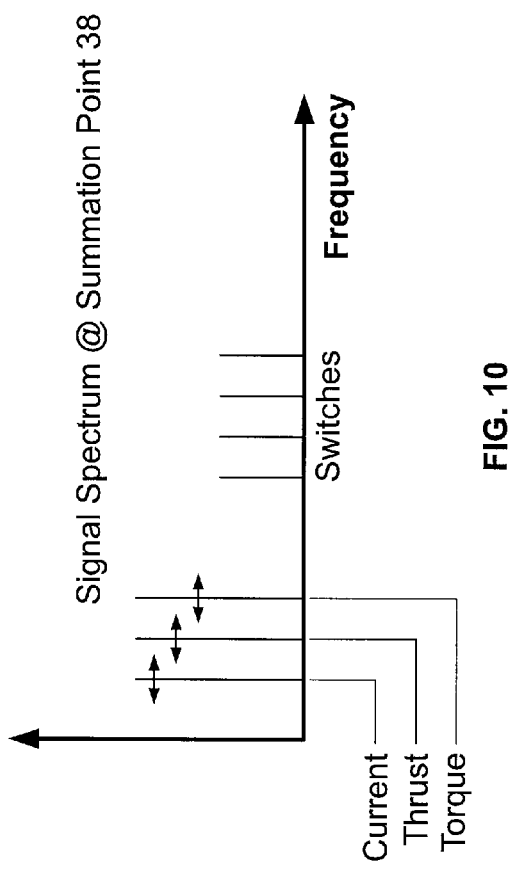

POWER LINE DATA ACQUISITION

Priority to U.S. Provisional Patent Application Ser. No. 61/211,165 filed Mar. 26, 2009, is claimed, the entire disclosure of which is hereby incorporated by reference.

The present invention relates generally to nuclear power plants, and more particularly to the motor operated valves.

BACKGROUND

Currently, safety related motor operated valves (MOV) are tested at the valve location using portable diagnostic equipment. Such diagnostic equipment can only be used during the plant outages, which can be as long as 18 months apart in nuclear plants. The work performed during the diagnostic is labor intensive and requires two to three technicians and, depending on the environment, the test operators can be subjected to undesirable levels of radiation, temperature or chemical hazards.

One proposed solution to this problem is to install additional wiring to and from the MOV through the containment penetrations to the motor control center (MCC) outside the containment. The MOV diagnostic signals are brought to a central location (centry), digitized and brought outside of the safety boundary via another set of wiring. However, this solution requires external cabling routed around the plant floor, and a limited number of signals brought together per centry. Furthermore, additional electronic equipment may be necessary and maintained in the hazardous plant environment.

SUMMARY OF THE INVENTION

An object of the present invention is to provide diagnostic acquisition of data signals, such as torque, thrust and switch motor current, using the already existing MOV power lines or existing spare wires.

An embodiment of the present invention provides a motor operated valve diagnostic data acquisition system comprising: a motor operated valve assembly; a transmitter, the transmitter being permanently connected in a housing of a motor operated valve assembly; a receiver, the transmitter transmitting signals to the receiver via motor operated valve cables, the cables being existing motor operated valve cables; and electronic circuitry connected to the receiver, the electronic circuitry processing the signals received by the receiver.

DESCRIPTION OF THE DRAWINGS

An embodiment of the present invention is shown with respect to the drawings in which:

FIG. 9a shows an exemplary signal entering the switch signal conditioner for the transmitter;

FIG. 9b shows an exemplary signal leaving the switch signal conditioner for the transmitter; and FIG. 10 shows an exemplary signal spectrum at a summation point.

DETAILED DESCRIPTION

A diagnostic system in accordance with an embodiment of the present invention includes of a transmitter located at the MOV location and a receiver located at the MOV cable termination point such as the MCC. Data is transmitted via permanently installed electronics in the MOV switch box housing. The existing wiring (data transmission and power) connects the MOV to the outside of the safety boundary. Outside the safety boundary, the signals can be networked using computer controlled switch boxes that can drastically increase the number of valves that can be monitored. The signals can also be networked for diagnostics of multiple valves. The existing MOV cables may be 'energized lines' such as a torque switch, limit switches, light indicator lights and heater lines, or 'non-energized lines' such as spare lines that were installed but not being used. The present invention requires no additional digital acquisition electronics inside the plant floor.

Figure 1:
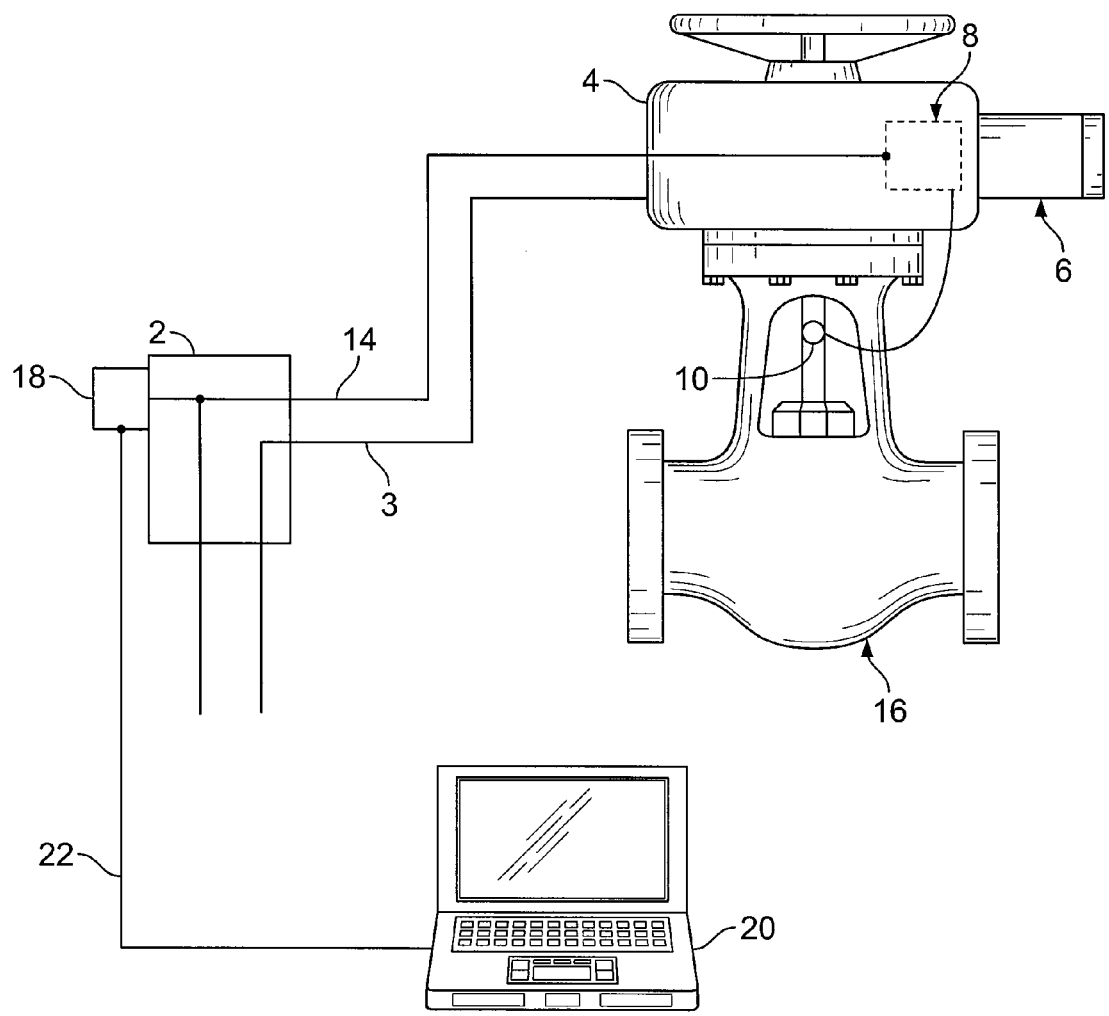
FIG. 1 shows the components of an embodiment of the present invention.

FIG. 1 shows a MOV assembly 4. MOV assembly 4 includes an actuator motor 6, a strain gage device 10 and a valve 16. Existing MOV cables include motor power leads 3 and data transmission line 14. The diagnostic invention has two sections, a transmitter 8 and a receiver 18. Transmitter 8 is permanently installed in the switch cover of the MOV 4. This allows the data acquisition to be performed at any time valve 16 is operated. Transmitter 8 receives analog signals from torque, thrust and current probe transducers (SG1, SG2) in strain gage device 10. Transmitter 8 also receives on/off signals from switches (SW1, SW2, SW3, SW4) associated with MOV 4. These include light indicators and open/close torque switches. Transmitter 8 transmits data to receiver 18 via data transmission line 14. Receiver 18 is located at a remote access point on the MOV cabling. A preferable location is an 'easy access' point such as MCC 2. Receiver 18 provides the data to computer 20 via data access cable 22. Transmitter 8 receives power from receiver 18 using the same line used for transmitting the modulated signals: data transmission line 14.

Figure 2:
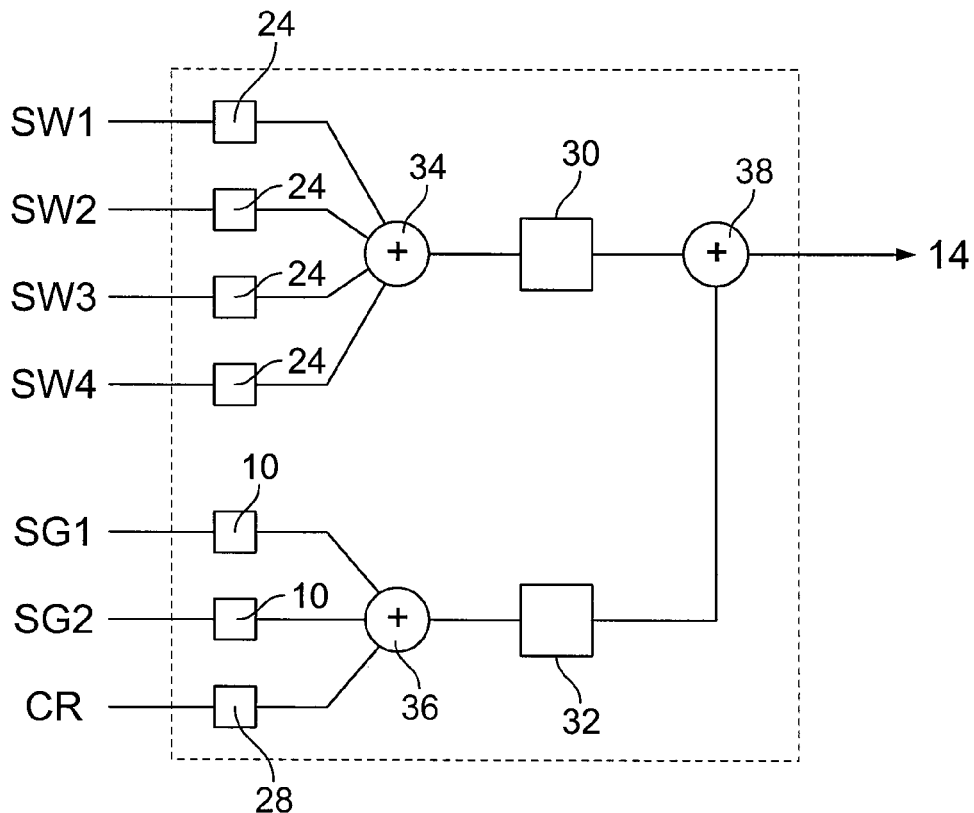
FIG. 2 shows an exemplary transmitter in the motor operated valve of FIG. 1.

FIG. 2 shows transmitter 8 including four switch signal conditioners 24, two strain gage conditioners 10 and a motor current signal conditioner 28. Transmitter 8 also includes a LP filter 30 for the on/off channels of switches 24 and a LP filter 32 for analog channels of strain gages 10 and motor current signal 28. Prior to LP filter 30, 32 are summation points 34, 36 respectively. After LP filters 30, 32 is a summation and data transmission point 38 to transmission line 14. Outputs of the analog and switch signals are low passed filtered first with filters 30, 32 and summed together at the transmitter output point 38.

Figure 3:
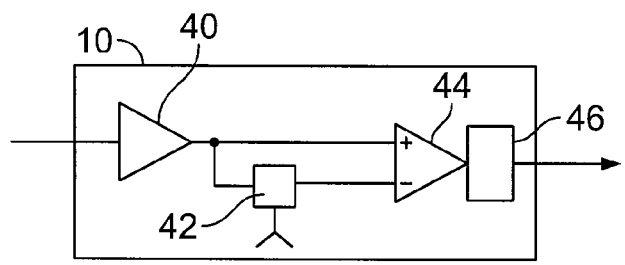
FIG. 3 shows an exemplary strain gage conditioner for the transmitter of FIG. 2 in further detail.

FIG. 3 shows an exemplary strain gage conditioner 10 including a preamplifier 40, zeroing electronics 42, post amplifier 44 and a modulator 46. The strain gage signals (SG1, SG2) are first preamplified by preamplifier 40 and then zeroed by zeroing electronics 42 and then amplified again by post amplifier 44. The output is processed with frequency modulator 46 and sent to summation point 36.

Figure 4:
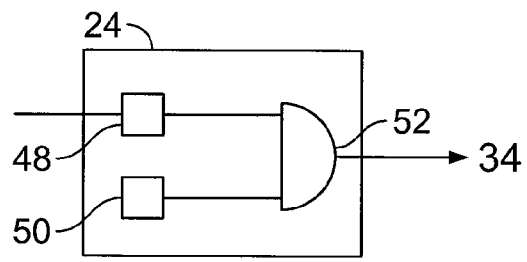
FIG. 4 shows an exemplary switch signal conditioner for the transmitter of FIG. 2 in further detail.

FIG. 4 shows an exemplary switch signal conditioner 24 including a sensor 48, a constant frequency generator 50 and an AND gate 52 for switch signal modulation. Switch signals (SW1, SW2, SW3, SW4) generate on on/off sensors 48 that provide the enabling and disabling of AND gate 52. AND gate 52 enables the output of the constant frequency signal generator 50. Output of switch signal conditioner 24 is sent to summation point 34.

Figure 5:
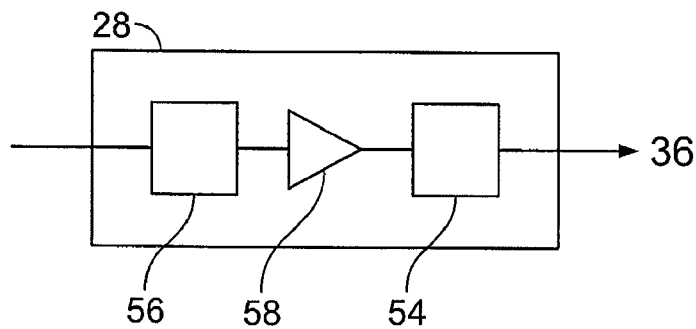
FIG. 5 shows an exemplary current signal conditioner for the transmitter of FIG. 2 in further detail.

FIG. 5 shows an exemplary current signal conditioner 28 including a channel modulator 54, a signal sensor 56 and a RMS/DC converter 58. Current signals (CR) are conditioned first by sensor 56 by RMS/DC conversion. This output is processed with current channel modulator 54 and sent to summation point 36.

Figure 6A:
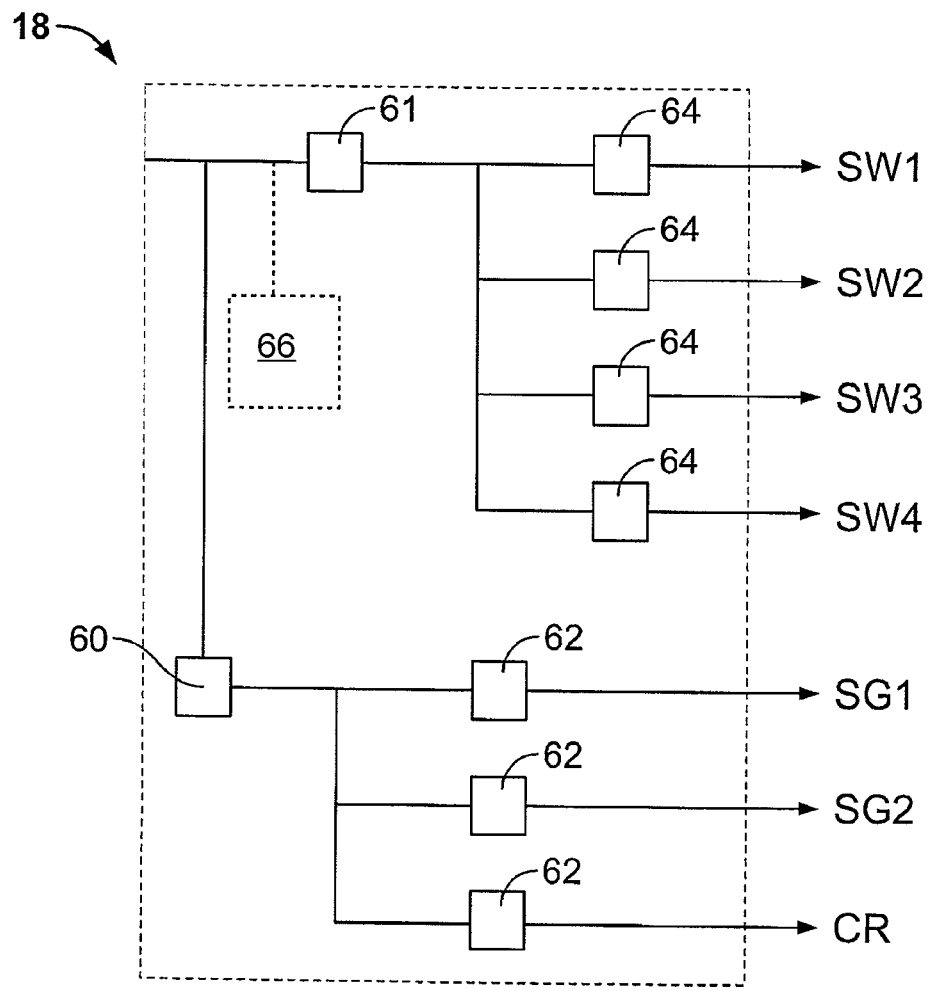
FIGS. 6a and 6b show exemplary receivers for the embodiment of FIG. 1 in further detail.
Figure 6B:
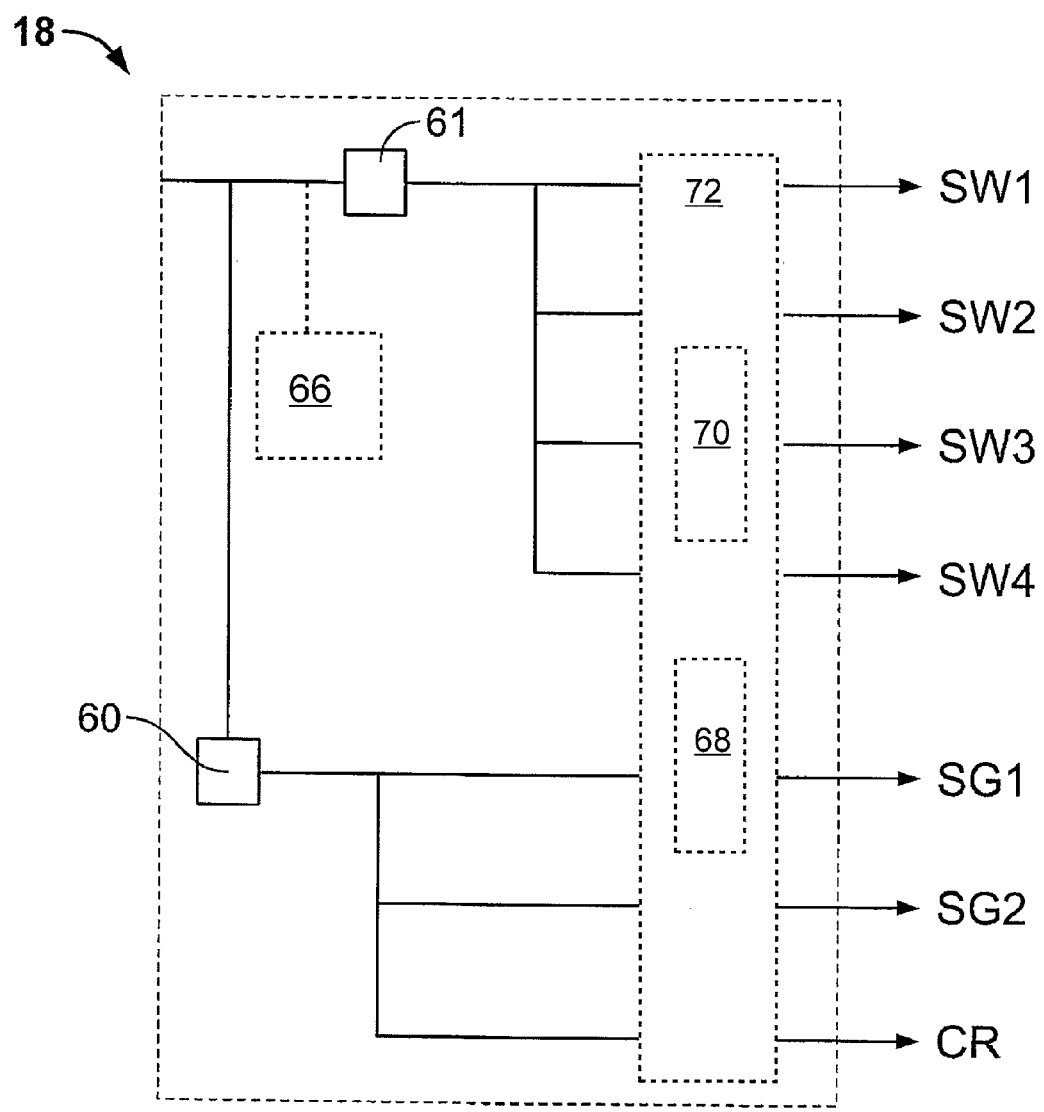
Figure 7A:
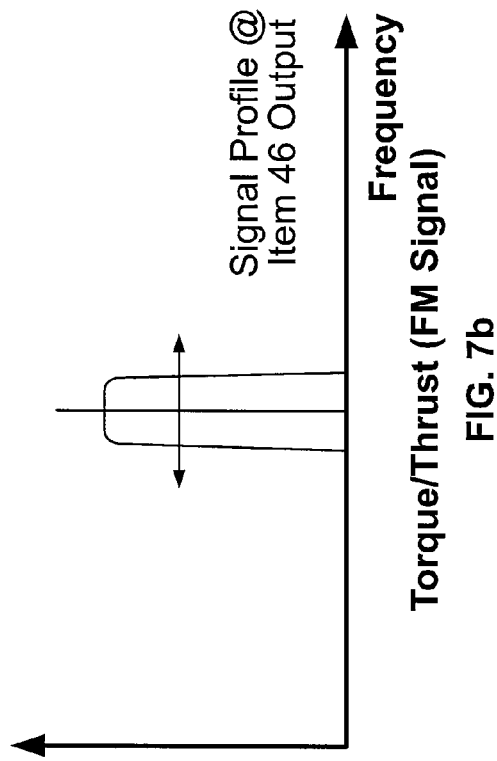
FIG. 7a shows an exemplary torque/thrust signal entering strain gage conditioner
Figure 7B:
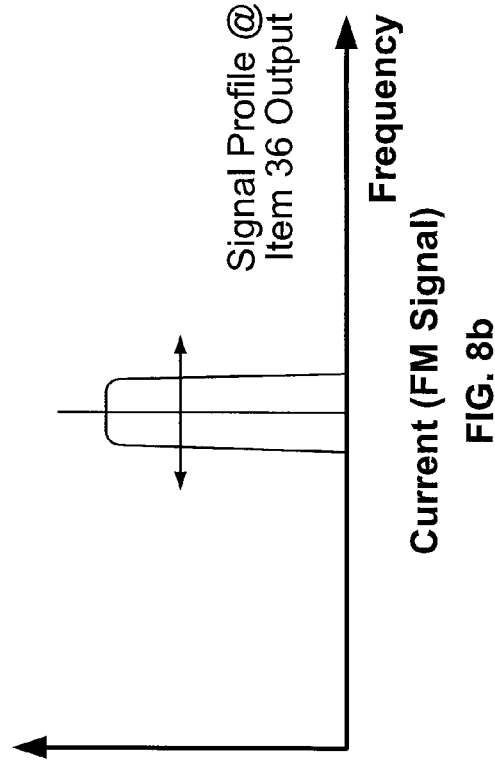
FIG. 7b shows an exemplary signal exiting the strain gauge conditioner.
Figure 8A:
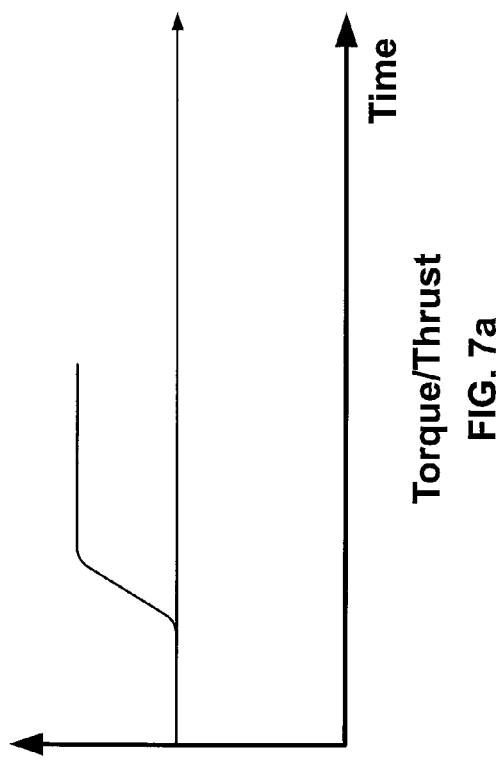
FIG. 8a shows an exemplary current motor signal entering the current signal conditioner for the transmitter.
Figure 8B:
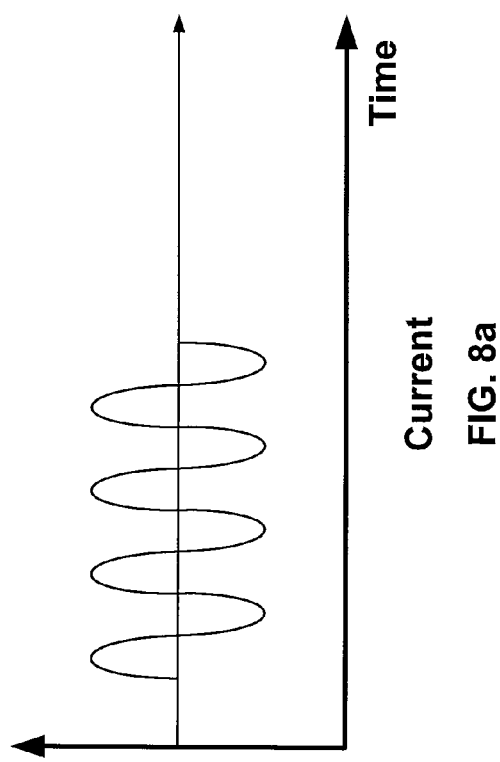
FIG. 8b shows an exemplary current motor signal exiting the current signal conditioner for the transmitter.

FIG. 6a shows an exemplary receiver 18 containing analog channel demodulator devices 62, on/off channel demodulator devices 64, low pass filter 61 and high pass filter 60. Receiver 18 also contains a power supply 66 and supplies power to transmitter 8 over data transmission line 14. Receiver 18 receives the FM signal from transmitter 8. The received signal passes through low pass filter 61 to strip its DC component, leaving an FM signal that is passed to the four on/off channel demodulator devices 64 which demodulate the signal to provide signals SW1, SW2, SW3, and SW4. The received signal also passes through high pass filter 60 to strip its DC component, leaving an FM signal that is passed to the three analog channel demodulator devices 62, which demodulate the signal to provide signals SG1, SG2, and CR. The demodulated signals can then be processed by further electronic circuitry or by a microprocessor. Alternatively, as shown in FIG. 6b, the demodulators 62 and 64 can be replaced with an A/D Converter 68 (Analog-to-Digital Converter) connected to a microprocessor 70 executing signal conditioning software. The A/D converter 68 and microprocessor 70 may, in turn, be a computer 72 having an A/D Converter card.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A motor operated valve diagnostic data acquisition system comprising:
    a motor operated valve assembly inside a containment in a nuclear power plant;
    a transmitter, the transmitter being permanently connected at the motor operated valve assembly inside the containment;
    a receiver outside the containment, the transmitter transmitting diagnostic data signals to the receiver via motor operated valve cables, the cables being existing motor operated valve cables; and
    electronic circuitry connected to the receiver, the electronic circuitry processing the diagnostic data signals received by the receiver.

2. The system as recited in claim 1 wherein the cables are energized lines.

3. The system as recited in claim 2 wherein the energized lines are a torque switch, a limit switch, light indicator lights or heater lines.

4. The system as recited in claim 1 wherein the cables are non-energized lines.

5. The system as recited in claim 4 wherein the non-energized lines are installed spare lines.

6. The system as recited in claim 1 wherein the transmitter includes a transducer interface, modulator electronics and output buffer electronics.

7. The system as recited in claim 1 wherein the receiver is located in a remote access point on the motor operated valve cables.

8. The system as recited in claim 7 wherein the remote access point is a motor control center.

9. The system as recited in claim 1 wherein the receiver comprises a power supply and demodulator electronics for demodulating the received signal.

10. The system as recited in claim 9 wherein the demodulator electronics includes a plurality of demodulators.

11. The system as recited in claim 9 wherein the demodulation is by a digital signal processing with a computer.

12. The system as recited in claim 9 wherein the power supply supplies power to the transmitter on a same cable for transmitting signals.

13. The system as recited in claim 1 wherein the receiver comprises a computer having an A/D card and signal conditioning software.

14. The system as recited in claim 1 wherein the signal is a torque, thrust or switch motor current.

15. The system as recited in claim 1 wherein the diagnostic data signals include at least one strain gauge signal, at least one switch signal and a motor current signal.

16. A motor operated valve diagnostic data acquisition system comprising:
    a motor operated valve assembly;
    a transmitter, the transmitter being permanently connected in a housing of the motor operated valve assembly;
    a receiver, the transmitter transmitting signals to the receiver via motor operated valve cables, the cables being existing motor operated valve cables; and
    electronic circuitry connected to the receiver, the electronic circuitry processing the signals received by the receiver;
    wherein the transmitter includes one on/off signal and one analog signal, the on/off and analog signals being summed at a summation point.

17. The system as recited in claim 16 further comprising a low pass filter.

18. The system as recited in claim 16 wherein the receiver includes two demodulators.

19. A motor operated valve diagnostic data acquisition system comprising:
    a motor operated valve assembly;
    a transmitter, the transmitter being permanently connected in a housing of the motor operated valve assembly;
    a receiver, the transmitter transmitting signals to the receiver via motor operated valve cables, the cables being existing motor operated valve cables; and
    electronic circuitry connected to the receiver, the electronic circuitry processing the signals received by the receiver;
    wherein the transmitter includes a plurality of on/off signals and a plurality of analog signals, the plurality of the on/off signals being summed together at on/off signal summation point and the plurality of analog signals being summed together at an analog summation point.

20. The system as recited in claim 19 further comprising a low pass filter for an output of the on/off summation point and a low pass filter for an output of the analog summation point, wherein each low pass filter output is summed together at a transmission output point.

21. The system as recited in claim 19 wherein the receiver includes a plurality of on/off demodulators and a plurality of analog demodulators.

* * * * *